US012718219B2

(12) United States Patent
Sasaki

(10) Patent No.: US 12,718,219 B2
(45) **Date of Patent: *Aug. 25, 2026**

(54) LOG-IN CONTROL APPARATUS, CONTROL METHOD OF LOG- IN CONTROL APPARATUS, AND INFORMATION TERMINAL

(71) Applicant: Toshiba Tec Kabushiki Kaisha, Tokyo (JP)

(72) Inventor: Yuta Sasaki, Izunokuni Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 147 days.

This patent is subject to a terminal disclaimer.

(21) Appl. No.: 18/658,744

(22) Filed: May 8, 2024

(65) Prior Publication Data

US 2024/0296433 A1 Sep. 5, 2024

Related U.S. Application Data

(63) Continuation of application No. 18/308,558, filed on Apr. 27, 2023, now Pat. No. 12,008,536, which is a (Continued)

(30) Foreign Application Priority Data

Apr. 18, 2018 (JP) ................................ 2018-080128

(51) Int. Cl.

| | |
|---|---|
| ***G06Q 20/20*** | (2012.01) |
| ***G07G 1/00*** | (2006.01) |
| ***G07G 1/14*** | (2006.01) |

(52) U.S. Cl.

CPC ......... *G06Q 20/206* (2013.01); *G07G 1/0009* (2013.01); *G07G 1/14* (2013.01)

(58) Field of Classification Search

CPC ....... G06Q 20/206; G07G 1/0009; G07G 1/14

See application file for complete search history.

(56) References Cited

U.S. PATENT DOCUMENTS

| | | | |
|---|---|---|---|
| 4,071,740 | A | 1/1978 | Gogulski |
| 4,929,819 | A | 5/1990 | Collins, Jr. |

(Continued)

FOREIGN PATENT DOCUMENTS

| | | | |
|---|---|---|---|
| JP | 2007034789 | A | 2/2007 |
| JP | 2011203058 | A | 10/2011 |

(Continued)

OTHER PUBLICATIONS

Karjol, Srinidhi, et al. "An IOT based smart shopping cart for smart shopping." International Conference on Cognitive Computing and Information Processing. Singapore: Springer Singapore, 2017. (Year: 2017).*

(Continued)

*Primary Examiner* — Nathan A Mitchell

(74) *Attorney, Agent, or Firm* — Kim & Stewart LLP

(57) ABSTRACT

In one embodiment, a log-in control apparatus has a processor which controls an operation for log-in to an information terminal moving along with a carrier for carrying a commodity to be purchased. The processor detects a state in which the commodity is placed on the carrier, in cooperation with a sensor attached to the carrier. The processor detects the operation for log-in to the information terminal, in cooperation with an input device included in the information terminal. When the processor detects the operation for log-in, in a case in which the processor detects the state in which the commodity is placed on the carrier, the processor judges that the operation for log-in is ineffective.

12 Claims, 6 Drawing Sheets

Related U.S. Application Data continuation of application No. 17/478,502, filed on Sep. 17, 2021, now Pat. No. 11,669,823, which is a continuation of application No. 16/298,526, filed on Mar. 11, 2019, now Pat. No. 11,151,539.

(56) References Cited

U.S. PATENT DOCUMENTS 5,898,158 A 4/1999 Shimizu
10,339,515 B1 * 7/2019 Johnson ................ B62B 3/1444
11,151,539 B2 10/2021 Sasaki
11,669,823 B2 6/2023 Sasaki
2002/0194075 A1 * 12/2002 O'Hagan .............. H02J 7/0044 705/20
2004/0041021 A1 3/2004 Nugent
2004/0252025 A1 * 12/2004 Silverbrook ....... G06K 7/10693 235/431
2005/0154646 A1 * 7/2005 Chermesino ....... G06Q 30/0641 705/26.61
2007/0143188 A1 * 6/2007 Kelley ................... G06Q 20/20 705/26.1
2008/0001742 A1 * 1/2008 Bauchot ................. G07G 1/009 340/568.5
2008/0183507 A1 * 7/2008 Lutnick .................. G06Q 50/18 705/4
2012/0284132 A1 * 11/2012 Kim ....................... G06Q 20/18 235/375
2012/0296751 A1 * 11/2012 Napper ................ G06Q 20/208 705/23
2013/0191230 A1 7/2013 Edwards
2014/0344011 A1 * 11/2014 Dogin ................ G06Q 20/3224 705/7.29
2015/0088642 A1 * 3/2015 Mathew ............. G06Q 30/0633 705/26.7
2015/0178863 A1 6/2015 Bostwick
2015/0206121 A1 * 7/2015 Joseph ................. G07G 1/0072 705/26.8
2016/0253647 A1 9/2016 Gotanda
2016/0358145 A1 * 12/2016 Montgomery ...... G06F 16/9535
2017/0158215 A1 * 6/2017 Phillips ................. B62B 5/0096
2017/0161703 A1 * 6/2017 Dodia .................. G07G 1/0072
2017/0206533 A1 * 7/2017 Watanabe .......... G06Q 30/0643
2017/0221060 A1 8/2017 Boyd
2018/0158056 A1 * 6/2018 Williams ............. G06Q 20/208
2018/0197218 A1 * 7/2018 Mallesan ............. G07G 1/0054
2019/0050921 A1 2/2019 Ryner
2019/0073655 A1 3/2019 Barkan
2019/0073656 A1 * 3/2019 Joseph ............. G06Q 20/40145
2020/0034812 A1 * 1/2020 Nemati .................. G06Q 20/14
2020/0275059 A1 * 8/2020 De Bonet ............ G06V 10/141
2021/0117950 A1 * 4/2021 Bentsur .................. G01G 19/08
2023/0259913 A1 8/2023 Sasaki

FOREIGN PATENT DOCUMENTS

JP 2016057813 A 4/2016
JP 2017126289 A 7/2017
JP 2017156934 A 9/2017

OTHER PUBLICATIONS

Japanese Office Action dated Jun. 20, 2023, mailed in counterpart Japanese Application No. 2022-112610, 6 pages (with translation).

Japanese Office Action dated Nov. 24, 2021, mailed in counterpart Japanese Application No. 2018-080128, 6 pages (with translation).

Yewatkar, Ankush & Inamdar, Faiz & Singh, Raj & Ayushya, & Bandai, Amol. (2016). Smart Cart with Automatic Billing, Product Information, Product Recommendation Using RFID & Zigbee with Anti-Theft. Procedia Computer Science. 79. 793-800, 10.1016/j.procs.2016.03.107. (Year: 2016).

Berdaliyev et al. "RFID-Cloud Smart Cart System". 2016 Intl. Conference on Advances in Computing, Communications and Informatics (ICACCI), Sep. 21-24, 2016, Jaipur, India (Year: 2016).

Extended European Search Report dated Sep. 20, 2019, mailed in counterpart European Application No. 19165424.3, 7 pages.

* cited by examiner

LOG-IN CONTROL APPARATUS, CONTROL METHOD OF LOG- IN CONTROL APPARATUS, AND INFORMATION TERMINAL

CROSS-REFERENCE TO RELATED APPLICATIONS

This application is a continuation of U.S. patent application Ser. No. 18/308,558, filed on Apr. 27, 2023, which is a continuation of U.S. patent application Ser. No. 17/478,502, filed on Sep. 17, 2021, now U.S. Pat. No. 11,669,823, granted on Jun. 6, 2023, which is a continuation of U.S. patent application Ser. No. 16/298,526, filed on Mar. 11, 2019, now U.S. Pat. No. 11,151,539, granted on Oct. 19, 2021, which is based upon and claims the benefit of priority from Japanese Patent Application No. 2018-080128, filed on Apr. 18, 2018, the entire contents of each of which are incorporated herein by reference.

FIELD

Embodiments described herein relate generally to a log-in control apparatus, a control method of a log-in control apparatus, and an information terminal having a function of a log-in control apparatus.

BACKGROUND

Recently, in retail stores such as a supermarket, a cart POS system has been considered in order to eliminate congestion. The cart POS system uses a shopping cart provided with an information terminal having a scanner and so on. The information terminal accepts an operation for log-in by a customer. When the log-in is approved, the information terminal becomes able to perform information processing. A customer whose log-in has been approved walks around a sales floor with the shopping cart. At the time of putting a commodity which the customer tries to purchase into the shopping cart, the customer makes the scanner read a bar code of the commodity to register sales data of the commodity into the information terminal. The customer who has finished registration of the sales data of the commodity performs accounting using a counting machine installed in an accounting place. In the cart POS system like this, since the registration work is performed on the sales floor, it is estimated that congestion of the accounting place will be eliminated.

In the store in which the cart POS system is introduced, there is a possibility that a commodity whose sales data has not been registered is taken out from the store without being subjected to accounting, depending on an action of a customer. Accordingly, it is considered to make the information terminal have a function to detect that a commodity whose sales data has not been registered is put into a shopping cart. But, the information terminal does not perform information processing until the log-in of the customer is approved. Accordingly, when the commodity whose sales data has not been registered has been put into the shopping cart before the operation of log-in, the commodity cannot be detected.

DETAILED DESCRIPTION

Figure 1:
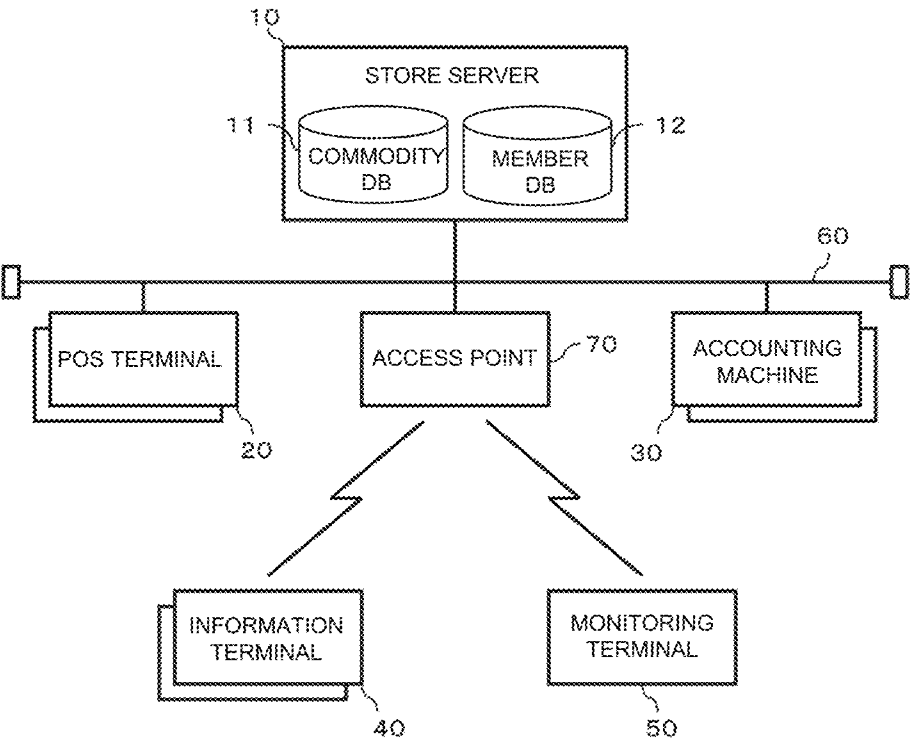
FIG. 1 is a diagram showing a whole configuration of a cart POS system according to an embodiment.

According to one embodiment, a log-in control apparatus controls an operation for log-in to an information terminal moving along with a carrier for carrying a commodity to be purchased by a customer. The log-in control apparatus has a sensor, an input device, a memory, and a processor. The sensor is attached to the carrier, and detects a state of an area in which the commodity is placed on the carrier to output a detection result. The input device accepts the operation for log-in to the information terminal to input information for log-in. The memory stores a program to control the operation for log-in. The processor executes the program to detect a state in which whether or not the commodity is placed on the carrier, based on the detection result of the sensor attached to the carrier. Further, the processor detects the operation for log-in when the information for log-in is inputted by the input device. Further, when the processor detects the operation for log-in, in a case in which the processor detects the state in which the commodity is placed on the carrier, the processor judges that the operation for log-in is ineffective.

Hereinafter, a log-in control apparatus according to an embodiment will be described with reference to the drawings. In the drawings, the same symbols indicate the same or the similar portions. In addition, a log-in control apparatus to control log-in to an information terminal attached to a shopping cart to be used in a cart POS (Point of Sale) system will be exemplified in the embodiment. For details, the embodiment will be described supposing that the information terminal has a function as the log-in control apparatus.

FIG. 1 is a diagram showing a whole configuration of a cart POS system according to the present embodiment. The cart POS system has a store server 10, a POS terminal 20, an accounting machine 30, an information terminal 40 and a monitoring terminal 50. The information terminal 40 is attached to a shopping cart C shown in FIG. 4, for example.

The store server 10, the POS terminal 20 and the accounting machine 30 are connected to a network 60, such as a LAN (Local Area Network). An access point 70 is also connected to the network 60. Each of the information terminal 40 and the monitoring terminal 50 has a radio unit. The information terminal 40 and the monitoring terminal 50 perform radio communication with the access point 70. The access point 70 relays communication between the respective devices connected to the network 60 that are the store server 10, the POS terminal 20 and the accounting machine 30, and the information terminal 40 and the monitoring terminal 50.

The POS terminals 20, the accounting machines 30 and the information terminals 40 may be provided respectively by plural numbers in one store. The monitoring terminals 50 and the access points 70 may also be provided respectively by two or more depending on a scale of the store, and so on.

The store server 10 communicates with a customer terminal via a public network. The customer terminals are a tablet terminal, a smartphone, a personal computer, and so on which a customer possesses, for example. The public network is Internet, for example.

The store server 10 has a commodity database 11 and a member database 12. The commodity database 11 and the member database 12 may be stored in a storage device which the store server 10 has. In addition, the commodity database 11 and the member database 12 may be stored in a storage device of another device connected to the store server 10.

The commodity database 11 stores a commodity data record. The commodity data record is created for each commodity to be sold in the store. The commodity data record includes items of a commodity ID (Identification Data), a commodity name, a price, and so on. The commodity ID is a unique code set for each commodity for individually identifying each commodity. The commodity name and the price are a name of the commodity and a sales price per commodity which are to be identified by the commodity ID.

The member database 12 stores a member data record. The member data record is created for each customer who has made member registration such as a customer loyalty points member. The member data record includes items of a member ID, a log-in password, and so on. The member ID is a unique code set for each member for individually identifying each member. The member has a recording medium in which the member ID is recorded. The recording mediums are a magnetic card, a contact type IC (Integrated Circuit) card, a noncontact type IC card, a smartphone, and so on, for example. The log-in password is a character string which the member has set arbitrarily. Characters of the character string include a numeral, an alphabet, a symbol, and so on. The store server 10 arbitrarily updates the log-in password of the relevant member by communicating with the customer terminal which the customer possesses.

Figure 2:
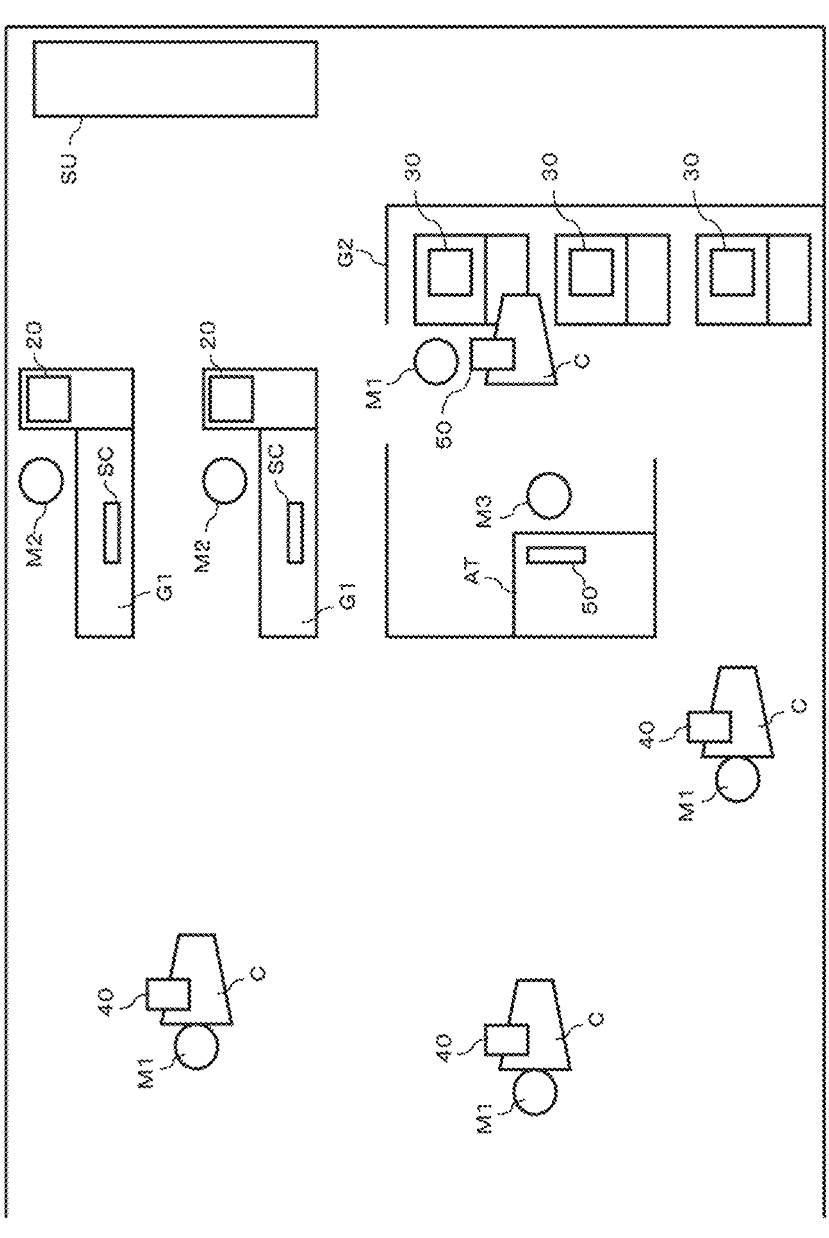
FIG. 2 is a diagram schematically showing a layout example of a store which has introduced the cart POS system according to the embodiment.

FIG. 2 is a diagram schematically showing a layout example of the store which has introduced the cart POS system. A shopping cart which a customer M1 who is a purchaser uses at the time of doing shopping in the store has the information terminal 40. In the following description, the shopping cart is referred to as a cart C. The cart C is an example of a carrier to carry a commodity to be purchased. A dolly, a cart or the like can become an example of the carrier. The customer M1 becomes a user of the information terminal 40. The customer M1 walks around the sales floor with the cart C, and places a commodity which the customer tries to purchase that is a so-called purchased commodity on the cart C. When placing the purchased commodity on the cart C, the customer M1 operates the information terminal 40 to perform registration of the purchased commodity. After having performed registration of the purchased commodity, the customer M1 goes to a face-to face register G1 or a self register G2. The customer M1 pays a price of the purchased commodity at the face-to face register G1 or the self register G2 to perform accounting of the commercial transaction. After having finished the accounting, the customer M1 performs bagging of the purchased commodity at a sacker table SU, if needed.

At the face to face register G1, a cashier M2 who is a sales clerk in charge of accounting service performs a registration operation and an accounting operation of the purchased commodity. The face-to-face register G1 has the POS terminal 20. The face-to-face register G1 has a scanner SC. The scanner SC may be a stationary type or a hand-held type. The cashier M2 performs a scan operation of a bar code of the purchased commodity one by one using the scanner SC to register sales data of the purchased commodity into the POS terminal 20. The POS terminal 20 calculates a settlement amount of the registered purchased commodities. The customer M1 pays a price corresponding to the settlement amount to the cashier M2. It is possible to pay the price with cash, a credit card, electronic money, customer loyalty points, a cash voucher such as a gift certificate, or the like. The POS terminal 20 is an example of a commodity sales processing device to perform processings of registration and accounting of the purchased commodity. The POS terminal 20 is an existing POS terminal which is used in a store having the face-to-face register G1.

At the self register G2, the customer M1 performs registration and accounting processings of the purchased commodity by oneself. The self register G2 has the accounting machine 30. When the customer M1 operates the information terminal 40, the store server 10 calculates a settlement amount of the registered purchased commodities. The store server 10 notifies the calculated settlement amount to the accounting machine 30 via the network 60. The customer M1 pays a price corresponding to the settlement amount to the accounting machine 30 to which the above-described settlement amount has been notified. It is possible to pay the price with cash, a credit card, electronic money, loyalty reward points, or the like. The accounting machine 30 is an existing accounting machine which is used in a store system of a semi-self service system, for example.

An attendant counter AT is provided in the vicinity of the self register G2. As described above, in the store of the present embodiment, the customer M1 operates the information terminal 40 and the accounting machine 30, and thereby the customer M1 can consistently perform processings from the registration of the purchased commodities to the accounting thereof by oneself. However, on the other hand, a status can occur in which a sales clerk has to intervene by any means. For example, there is a case in which a special sales person has to perform information provision to the customer M1 to purchase drug medicine. For example, there is also a case in which the customer M1 has performed scanning of a bar code of a commodity by the information terminal 40, but the customer M1 does not sense that the scanning has been resulted in an error and the commodity registration has not been performed. Also in the accounting machine 30, there is a case in which an error such that coins are clogged or receipt sheets are run out is generated, for example. In order to rapidly deal with the status like this, an attendant M3 who is a sales clerk in charge of service is permanently stationed at the attendant counter AT. The monitoring terminal 50 is provided at the attendant counter AT. The attendant M3 monitors the state of each of the information terminals 40 and the accounting machines 30 using the monitoring terminal 50.

Figure 3:
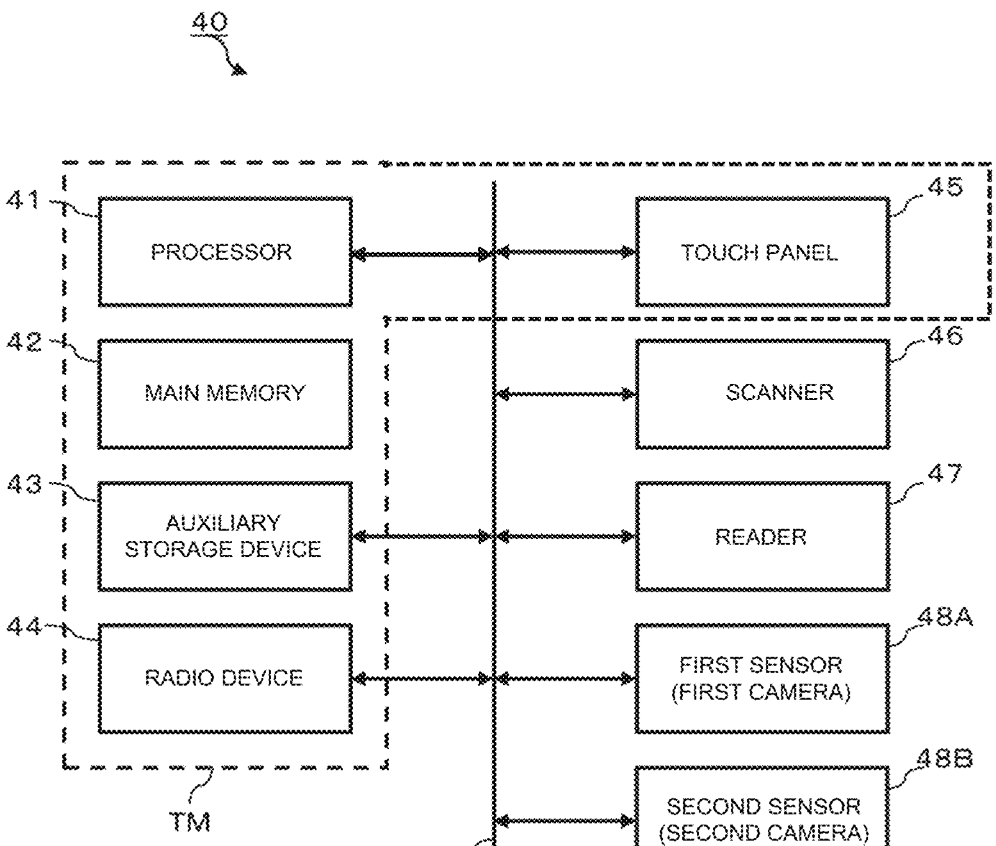
FIG. 3 is a block diagram showing a configuration of the information terminal included in the cart POS system shown in FIG. 1.

FIG. 3 is a block diagram showing a configuration of the information terminal 40. The information terminal 40 has a processor 41, a main memory 42, an auxiliary storage device 43, a radio device 44, a touch panel 45, a scanner 46, a reader 47, a first sensor 48A, a second sensor 48B and a system transmission path 49. The system transmission path 49 includes an address bus, a data bus, a control signal line, and so on. In the information terminal 40, the processor 41, the main memory 42, the auxiliary storage device 43, the radio device 44, the touch panel 45, the scanner 46, the reader 47, the first sensor 48A and the second sensor 48B are connected to the system transmission path 49. In the information terminal 40, a computer is composed of the processor 41, the main memory 42 and the auxiliary storage device 43, and the system transmission path 49 to connect these.

The processor 41 is a nerve center portion of the above-described computer. The processor 41 controls the respective portions of the information terminal 40 so as to realize various functions as the information terminal 40, in accordance with an operating system and an application program. The processor 41 is a CPU (Central Processing Unit), for example.

The main memory 42 is a main storage portion of the above-described computer. The main memory 42 includes a non-volatile memory area and a volatile memory area. The main memory 42 uses the non-volatile memory area as a program area to store the operating system and the application program. The main memory 42 may store data which is necessary when the processor 41 executes the processing for controlling the respective portions, in the non-volatile memory area or the volatile memory area. The main memory 42 uses the volatile memory area, as a work area in which data is arbitrarily rewritten by the processor 41. The non-volatile memory area is a ROM (Read Only Memory), for example. The volatile memory area is a RAM (Random Access Memory), for example.

The auxiliary storage device 43 is an auxiliary storage portion of the above-described computer. An EEPROM (Electric Erasable Programmable Read-only Memory), an HDD (Hard Disc Drive), an SSD (Solid State Drive), or the like is the auxiliary storage device 43. The auxiliary storage device 43 stores data which the processor 41 uses at the time of performing various processings, and data created by the processing of the processor 41. The auxiliary storage device 43 may store the above-described application program.

The touch panel 45 is a device which is provided with both of an input device and a display device of the information terminal 40. The touch panel 45 accepts an operation for log-in, for example, and inputs information for log-in, as the input device. The information for log-in includes a log-in password, a member ID, and so on. The information for log-in to be inputted into the touch panel 45 is a log-in password, for example. The touch panel 45 displays an image described later, as the display device. The information terminal 40 is installed with a browser for displaying an image on the touch panel 45, based on image data created by a Web server such as the store server 10

The scanner 46 reads a code symbol attached to the purchased commodity, for registration of the purchased commodity. The code symbol is a bar code, a two-dimensional data code, or the like, for example. The scanner 46 may be a type to read a code symbol by being scanned with laser light. The scanner 46 may be a type to read a code symbol from an image imaged by an imaging device.

The reader 47 is an input device to input a member ID that is the information for log-in. The reader 47 reads a member ID recorded in a recording medium. When the recording medium is a magnetic card, the reader 47 is a magnetic card reader. When the recording medium is a contact type IC card, the reader 47 is an IC card reader. In addition, when the recording medium is a recording medium using RFID (Radio Frequency Identification) such as a noncontact type IC card, a smartphone, or the like, an RFID reader is used as the reader 47.

Each of the first sensor 48A and the second sensor 48B is attached to the cart C, detects a state of an area in which an article (a commodity or the like) is placed on the cart C, and outputs a detection result. The first sensor 48A and the second sensor 48B are each a camera, for example. Hereinafter, the first sensor 48A and the second sensor 48B are respectively called the first camera 48A and the second camera 48B. The first camera 48A and the second camera 48B are each a CCD (Charge Coupled Device) camera. Each of the first camera 48A and the second camera 48B sets an area in which an article (a commodity or the like) is placed on the cart C to an imaging area. The imaging area will be described later.

The information terminal 40 includes a tablet terminal TM, for example. The tablet terminal TM has the processor 41, the main memory 42, the auxiliary storage device 43, the radio device 44 and the touch panel 45 which have been described above. The scanner 46, the reader 47, the first camera 48A and the second camera 48B which have been described above are electrically connected to the tablet terminal TM.

Figure 4:
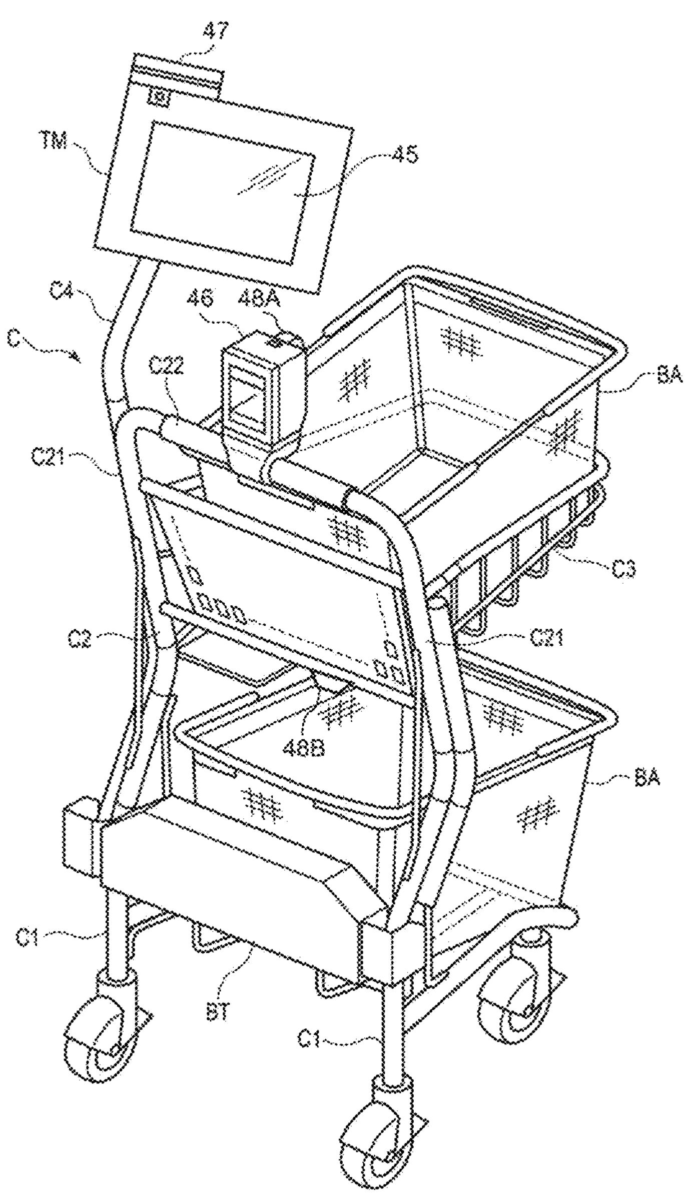
FIG. 4 is a perspective view showing an example of a cart attached with the information terminal.

FIG. 4 is a perspective view showing an example of the cart C attached with the information terminal 40. The cart C has a caster portion C1 for movement, a handle frame portion C2, and a basket receiving portion C3. The caster portion C1 has four wheels for making the cart C move smoothly on the floor surface. The handle frame portion C2 includes a pair of vertical frames C21, C21, and a handle bar C22. The pair of vertical frames C21, C21 are erected at the rear wheels side of the caster portion C1. The handle frame C22 couples the upper ends of the above-described vertical frames C21, C21. The basket receiving portion C3 is provided extending from a halfway portion of the handle frame portion C2 toward a front direction of the cart C. The front direction of the cart C is a direction in which the cart C proceeds when the handle bar C22 is pushed by a customer. The cart C can place shopping baskets BA for housing a commodity, on the basket receiving portion C3 and the caster portion C1, respectively.

The scanner 46 is attached to a halfway portion of the handle bar C22, for example. The scanner 46 is attached to the handle bar C22 so that a reading window is positioned at the front side. The above-described front side is a side at which a customer who holds the handle bar C22 and pushes the cart C stands.

A pole C4 is attached to the vertical frame C21 at one side. The pole C4 has a tip which is positioned above the handle bar C22. The tablet terminal TM is attached to the tip portion of the pole C4 so that a screen of the touch panel 45 is headed for the front side. The reader 47 is attached to the tablet terminal TM so that a card slit is positioned at the front side. The reader 47 in FIG. 4 is a magnetic card reader, for example. A battery BT is attached to a lower end side of the handle frame portion C2 across the vertical frames C21, C21. The battery BT is a power source for driving the tablet terminal TM and the scanner 46.

The first camera 48A is attached to a surface opposite to the reading window of the scanner 46 so that the basket receiving portion C3 becomes an imaging area. The second camera 48B is attached to a lower side of the basket receiving portion C3 so that the caster portion C1 becomes an imaging area. The attaching positions of the first camera 48A and the second camera 48B are not limited to the above-described portions. The first camera 48A has only to be attached to the cart C so that the basket receiving portion C3 becomes the imaging area. The second camera 48B has only to be attached to the cart C so that the caster portion C1 becomes the imaging area.

Figure 5:
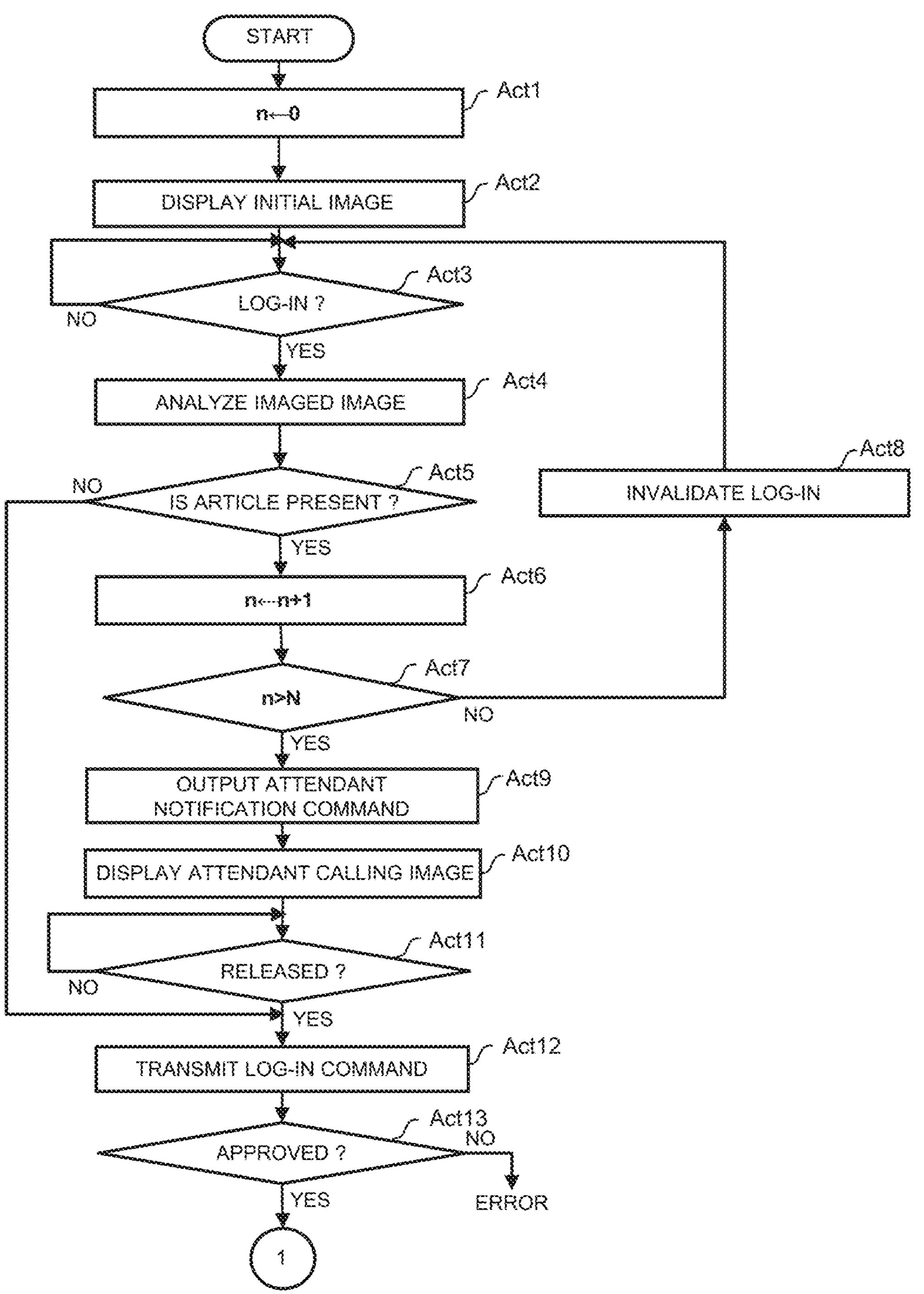
FIG. 5 is a flow chart showing an information processing which the processor of the information terminal executes.
Figure 6:
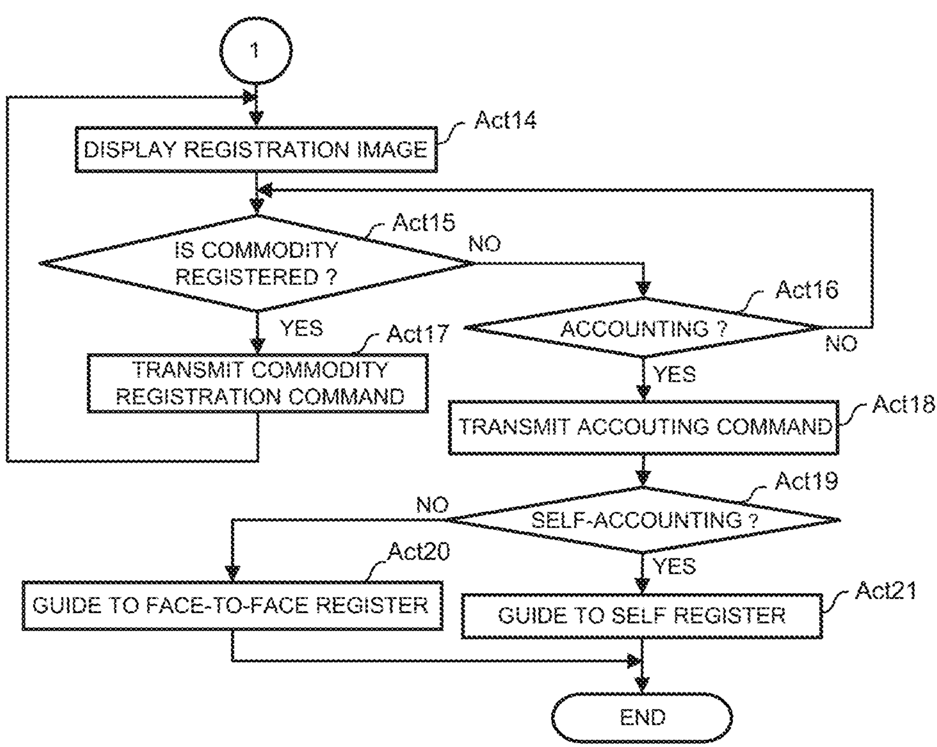
FIG. 6 is a flow chart showing an information processing which the processor of the information terminal executes.

FIG. 5 and FIG. 6 are flow charts showing a main information processing which the processor 41 of the information terminal 40 executes. The processor 41 executes the information processing shown in the flow charts of FIG. 5 and FIG. 6, in accordance with the program stored in the main memory 42 or the auxiliary storage device 43. Hereinafter, the main information processing of the information terminal 40 will be described using FIG. 5 and FIG. 6. The information processing described below is an example. If the similar effect can be obtained, the content of the information processing including a procedure thereof is not particularly limited to this example.

When the program is started, the processor 41 of the information terminal 40 starts a processing. In Act1, the processor 41 resets a count value n of a retry counter to "0". The retry counter exists in the volatile memory area of the main memory 42. The retry counter counts the number of times of operation for log-in by the customer M1 described later, and stores its count value n. When the count value n of the retry counter is resets to "0", the processing of the processor 41 proceeds to Act2. In Act2, the processor 41 makes the touch panel 55 display an initial image. The content of the initial image is optional. The processor 41 makes the touch panel 45 display an image to describe a procedure of log-in, for example, as the initial image. It is preferable that the initial image includes a guidance such that "is the cart vacant?", for example. The information terminal 40 receives image data of the initial image from the store server 10.

Here, when the customer M1 who is a member comes to the store, for example, the customer M1 takes out the cart C from a cart storage space. The customer M1 confirms that the initial image is displayed on the touch panel 45 of the information terminal 40 attached to the cart C. After having confirmed the initial image, the customer M1 performs an operation for log-in to the information terminal 40. That is, the customer M1 makes the reader 47 read data of a recording medium in which a member ID is recorded. And the customer M1 inputs a log-in password from the touch panel 45.

After having the processing of the above-described Act2, the processor 41 waits for an operation for log-in in Act3. When the data of the recording medium recorded with the member ID is read by the reader 47, and the operation for log-in is accepted and the information for log-in (a log-in password, or the like) is inputted from the touch panel 45, the processor 41 judges that the operation for log-in has been performed. When it is judged that the operation for log-in has been performed (YES in Act3), the processing of the processor 41 proceeds to Act4. In Act4, the processor 41 makes the first camera 48A and the second camera 48B to be started. And the processor 41 analyzes images respectively imaged by the first camera 48A and the second camera 48B. In addition, timings of starting the first camera 48A and the second camera 48B are not limited. For example, the timings of starting the first camera 48A and the second camera 48B may be a time of the processing of Act2 or Act3.

Next, in Act5, the processor 41 determines whether or not an article (a commodity or the like) other than the shopping basket BA is placed on the basket receiving portion C3 and the caster portion C1, from the analysis results of the images imaged by the first camera 48A and the second camera 48B, respectively. When any article including the shopping basket BA is not placed on the basket receiving portion C3 and the caster portion C1, the processor 41 judges that an article is not placed on the basket receiving portion C3 and the caster portion C1. Or when the vacant shopping bag BA is placed on at least one of the basket receiving portion C3 and the caster portion C1, the processor 41 judges that an article is not placed on the basket receiving portion C3 and the caster portion C1. When it is judged that an article is not placed (NO in Act5), it is judged that the above-described operation for log-in (refer to the above-described Act3) is effective. And the processing of the processor 41 proceeds to Act12. The processing of Act12 will be described later.

When an article other than the shopping bag BA is placed on at least one of the basket receiving portion C3 and the caster portion C1, the processor 41 judges that the article is placed on the basket receiving portion C3 and the caster portion C1. When it is judged that the article is placed on the basket receiving portion C3 and the caster portion C1 (YES in Act5), the processing of the processor 41 proceeds to Act6. For example, when a commodity is housed in the shopping basket BA placed on the basket receiving portion C3, the processor judges that the article is placed on the basket receiving portion C3 (YES in Act5). The processor 41 judges it to be doubtful that an article is placed on the basket receiving portion C3 and the caster portion C1 before the operation for log-in, and performs the following processings.

That is, in Act6, the processor 41 counts up the count value n of the retry counter by "1". In Act7, the processor 41 confirms whether or not the count value n of the retry counter has exceeded a prescribed retry upper limit number of times N. Here, the count value n of the retry counter is an accumulated number of times of performing the operation for log-in. When the count value n of the retry counter does not exceed the retry upper limit number of times N (NO in Act7), the processing of the processor 41 proceeds to Act8. In Act8, the processor 41 judges that the above-described accepted operation for log-in (refer to the above-described Act3) is ineffective, and notifies that the operation for log-in is an ineffective operation to the customer M1. For example, the processor 41 displays a guidance such that "It has been judged that the operation for log-in is an ineffective operation. When a commodity or the like is placed on the cart, please remove it" on the touch panel 45.

After the processor 41 has notified that the operation for log-in is an ineffective operation, the processing of the processor 41 returns to the above-described Act3. That is, in the above-described Act8, the processor 41 deals with the operation for log-in as if it had not been performed. And, in Act3, the processor 41 waits for an operation for log-in again. When an operation for log-in is performed by the customer M1, that is, when the relevant operation for log-in is accepted by the touch panel 45 (YES in Act3), the processor 41 analyzes the respective imaged images by the first camera 48A and the second camera 48B in Act4, as described above. As a result, when an article other than the shopping basket BA is not placed on the basket receiving portion C3 and the caster portion C1 (NO in Act5), the processing of the processor 41 proceeds to Act12 described later.

When an article other than the shopping basket BA is still placed on the basket receiving portion C3 and the caster portion C1 (YES in Act5), the processing of the processor 41 proceeds to Act6 again. And, in the above-described Act6, the count value n of the retry counter is further counted up. And, in the above-described Act7 again, the count value n of the retry counter and the retry upper limit number of times N are compared again. At this time, when the retry upper limit number of times N is set to "1", for example, the processor 41 confirms that the count value n of the retry counter exceeds the retry upper limit number of times N in Act7. When the count value n of the retry counter exceeds the retry upper limit number of times N (YES in Act7), the processing of the processor 41 proceeds to Act9. In Act9, the processor 41 controls the radio device 44 so as to output an attendant notification command. By this control, the radio device 44 transmits the attendant notification command by radio. The attendant notification command is a command to notify the attendant of that the above-described operation for log-in has been performed in the state in which the above-described commodity is placed on the above-described cart C. The attendant notification command includes a terminal ID previously set for each of the information terminals 40 for individually identifying the relevant information terminal 40. That is, the information terminal 40 has a terminal ID which is assigned for being individually identified. The attendant notification command is received by the access point 70, and is transmitted to the store server 10 via the network 60.

The store server 10 which has received the attendant notification command transfers the attendant notification command to the monitoring terminal 50. That is, the attendant notification command is transmitted from the access point 70 by radio, and is received by the monitoring terminal 50. In the monitoring terminal 50 which has received the attendant notification command, a message is displayed for notifying that the operation for log-in has been judged to be ineffective in the information terminal 40 which is to be identified by the terminal ID included in the relevant attendant notification command. In other words, the monitoring terminal 50 displays a message to notify that the operation for log-in has been judged to be ineffective in the information terminal 40 which is to be identified by the terminal ID included in the relevant attendant notification command, based on the received attendant notification command. The attendant M3 who has confirmed this message heads for the customer using the cart C attached with the above-described identified information terminal 40. Or the attendant M3 instructs another sales clerk to head for the customer who has performed the operation for log-in which has been judged to be ineffective.

For example, the information terminal 40 has an alarm lamp or a buzzer. At the time of controlling the radio device 44 so as to output the attendant notification command in Act9, the processor 41 outputs a drive signal to the above-described alarm lamp or the buzzer. The alarm lamp is lighted by this drive signal. Or the buzzer sounds. The attendant M3 or the sales clerk moves aiming the cart C in which the alarm lamp is lighting or the cart C in which the busser is sounding. Accordingly, the attendant M3 or the sales clerk can smoothly move to the cart C in which the above-described operation for log-in judged to be ineffective has been performed.

The processor 41 which has controlled the radio device 44 so as to output the attendant notification command in the above-described Act9 displays an attendant calling image on the touch panel 45 in Act10. The attendant calling image includes a message such that "An attendant is being called. Please wait.", for example. The processor 41 displays this attendant calling image on the touch panel 45, and in addition, sets an operation for log-in to be in a temporarily ineffective state, for example. The member ID and the log-in password inputted by the operation for log-in becomes a temporarily holding state, based on this temporarily ineffective state.

The customer M1 who has confirmed the message waits for an attendant to come. The attendant who has moved to the customer M1, that is the attendant M3 or the sales clerk, confirms whether or not an article other than the shopping basket BA is placed on the cart C. When having confirmed that the article is placed, the attendant removes the article, and then operates the touch panel to input an instruction for releasing the temporarily ineffective state of the operation for log-in.

The processor 41 which has controlled the display of the attendant calling image in the above-described Act10 waits for an instruction input for releasing the temporarily ineffective state of the operation for log-in in Act11. When the instruction for releasing the temporarily ineffective state of the operation for log-in is inputted by the operation of the touch panel 45 (YES in Act11), the processor judges that the operation for log-in which has been in the temporarily ineffective state is effective. And the processing of the processor 41 proceeds to Act12.

In Act12, the processor 41 controls the radio device 44 so as to output a log-in command based on the operation for log-in which has been judged to be effective as described above. By this control, the radio device 44 transmits the log-in command to the store server 10 by radio. The log-in command includes the member ID and the log-in password which are the information for log-in inputted by the operation for log-in which has been judged to be effective as described above. The log-in command is received by the access point 70, and is transmitted to the store server 10 via the network 60.

Here, the computer mainly composed of the processor 41 executes the processings of Act4 and Act5 in accordance with the program, in cooperation with the first camera 48A and the second camera 48B, to compose first detection means. That is, the computer mainly composed of the processor 41 detects a state in which whether or not a commodity is placed on the cart C that is a carrier to carry the commodity to be purchased by the customer M1 who is a purchaser.

The computer mainly composed of the processor 41 executes the processing of Act3 in accordance with the program, in cooperation with the touch panel 45 and the reader 47, to compose second detection means. That is, the computer mainly composed of the processor 41 detects an operation for log-in by the customer M1 who is the purchaser to the information terminal 40 moving with the cart C that is the carrier.

The computer mainly composed of the processor 41 executes the processings of Act5 to Act8 in accordance with the program, to compose invalidation means. That is, when the second detection means detects the operation for log-in, and the first detection means detects the state in which the commodity is placed on the cart C that is the carrier, the computer mainly composed of the processor 41 judges that the operation for log-in is ineffective. In other words, when the second detection means detects the operation for log-in, in the case in which the first detection means detects the state in which the commodity is placed on the cart C that is the carrier, the computer mainly composed of the processor 41 judges that the operation for log-in is ineffective. And, the computer mainly composed of the processor 41 deals with the relevant operation for log-in as if it had not been performed (refer to the above-described Act8), or sets the relevant operation for log-in to be in the temporarily ineffective state (refer to the above-described Act9 and Act10). In addition, when the second detection means detects the operation for log-in, and the first detection means detects the state in which a commodity is not placed on the cart C that is the carrier, the computer mainly composed of the processor 41 judges that the operation for log-in is effective. In other words, when the second detection means detects the operation for log-in, in the case in which the first detection means detects the state in which a commodity is not placed on the cart C that is the carrier, the computer mainly composed of the processor 41 judges that the operation for log-in is effective.

The computer mainly composed of the processor 41 executes the processings of Act8 and Act9 in accordance with the program, in cooperation with the radio device 44, to compose notification means. That is, when the second detection means detects the operation for log-in, and the first detection means detects the state in which the commodity is placed on the cart C that is the carrier, the computer mainly composed of the processor 41 notifies that the operation for log-in has been performed in the state in which the commodity is placed on the cart C. In other words, when the second detection means detects the operation for log-in, in the case in which the first detection means detects the state in which the commodity is placed on the cart C that is the carrier, the computer mainly composed of the processor 41 notifies that the operation for log-in has been performed in the state in which the commodity is placed on the cart C. Its notification destination is the monitoring terminal 50 that is an example of a terminal for a sales clerk to be connected to the information terminal 40 via a radio network and a wired network.

The store server 10 which has received the log-in command searches the member database 12. The store server 10 determines whether or not a log-in password of the member data record identified by the member ID included in the log-in command is coincident with the log-in password included in the relevant log-in command. When the log-in passwords are coincident, the store server 10 transmits a response command to approve the log-in to the information terminal 40 of the log-in command transmission source. When the log-in passwords are not coincident, the store server 10 transmits a response command to negate the log-in to the information terminal 40 of the log-in command transmission source. The response command is transmitted from the access point 70 by radio, and is received by the radio device 44 which the information terminal 40 of the log-in command transmission source has.

The processor 41 which has controlled the transmission of the log-in command in Act12 waits in Act13 until the response command from the store server 10 is received. When the response command to approve the log-in can be received within a definite time after the log-in command has been transmitted, (YES in Act13), the processing of the processor 41 proceeds to Act14 shown in FIG. 6.

In Act14, the processor 41 displays a registration image P1 on the touch panel 45. The registration image P1 is an image for displaying a name, a price, a total amount, and so on of the registered purchased commodity.

On the other hand, when the response command to approve the log-in cannot be received within the definite time after the log-in command has been transmitted, (NO in Act13), the processor 41 determines the operation for log-in as an error, and finishes the processing. For example, when the response command to negate the log-in is received, the processor 41 determines the operation for log-in as an error, and finishes the processing.

The customer M1 who has confirmed the registration image walks around the sales floor, and houses a commodity which the customer M1 tries to purchase, that is a purchased commodity, on the cart C. For example, the customer M1 houses the purchased commodity in the shopping basket BA placed on the basket receiving portion C3 or the caster portion C1. Before housing the purchased commodity on the cart C, the customer M1 operates the scanner 46 for the registration of the purchased commodity, to make a code symbol attached to the purchased commodity to be read by the scanner 46. When the scanner 46 reads the code symbol, the commodity ID indicated by the code symbol is inputted to the information terminal 40. By this means, the commodity identified by the commodity ID is registered as the purchased commodity.

A code symbol may not be attached to a certain commodity such as fresh food. When a code symbol is not attached to the purchased commodity, the customer M1 touches a commodity button corresponding to the purchased commodity from commodity buttons to be displayed on the touch panel 45. The commodity button is touched, and thereby a commodity ID of the commodity corresponding to the commodity button is inputted to the information terminal 40. That is, the commodity to be identified by the commodity ID is registered.

The processor 41 which has displayed the registration image in the above-described Act14 confirms next in Act15 whether or not the above-described commodity registration has been performed. When the commodity registration has not been performed (NO in Act15), the processing of the processor 41 proceeds to Act16. In Act16, the processor 41 confirms whether or not accounting has been instructed by the customer M1 via the registration image of the touch panel 45. The registration image includes a touch button of "accounting". When the touch button of "accounting" is touched (YES in Act16), the processor 41 recognizes that the accounting has been instructed. When the accounting has not been instructed (NO in Act16), the processing of the processor 41 returns to Act15. That is, the processor 41 waits in Act15 and Act16 until the commodity registration is performed or the accounting is instructed.

When the processor 41 confirms that the commodity registration has been performed in the waiting state of Act15 and Act16 (YES in Act15), the processing of the processor 41 proceeds to Act17. In Act17, the processor 41 controls the radio device 44 so as to transmit a commodity registration command to the store server 10. By this control, the radio device 44 transmits the commodity registration command to the store server 10 by radio. The commodity registration command includes the terminal ID of the relevant information terminal 40 and the commodity ID of the registered commodity. The commodity registration command is received by the access point 70, and is transmitted to the store server 10 via the network 60.

The store server 10 which has received the commodity registration command detects the commodity ID from the commodity registration command. The store server 10 searches the commodity database 11 to read a commodity data record including the commodity ID. The store server 10 generates commodity sales data, based on data such as the commodity name, the price, and so on included in the commodity data record. The store server 10 stores the commodity sales data in association with the terminal ID included in the commodity registration command. The store server 10 transmits a registration image added with the commodity name, the price and so on of the commodity sales data to the information terminal 40 of the commodity registration command transmission source. The data of the registration image is transmitted from the access point 70 by radio, and is received by the radio device 44 which the information terminal 40 of the commodity registration command transmission source has.

The processing of the processor 41 which has controlled the transmission of the commodity registration command in the above-described Act17 returns to Act14. The processor 41 displays the registration image on the touch panel 45, based on the registration image data received from the store server 10. The processor 41 becomes in the waiting state of Act15 and Act16, again. In this waiting state, when confirming that a next commodity registration has been performed (YES in Act15), the processor 41 repeats the processings of Act17 and Act14. Accordingly, the commodity names, prices and so on of the registered commodities are sequentially added to the above-described registration image.

When the processor 41 detects that accounting has been instructed (YES in Act16) in the waiting state of Act15 and Act16, the processing of the processor 41 proceeds to Act18. The processor controls the radio device 44 so as to transmit an accounting command to the store server 10 in Act18. The radio device 44 transmits the accounting command to the store server 10 by radio. The accounting command includes the terminal ID of the relevant information terminal 40. The accounting command is received by the access point 70, and is transmitted to the store server 10 via the network 60.

The store server 10 which has received the accounting command judges whether or not self-accounting is allowed, based on the commodity sales data stored in association with the terminal ID included in the accounting command. For example, when sales data of a commodity of drug medicine in which a special sales person has to perform information provision to the customer M1 is included in the relevant commodity sales data, self-accounting is not allowed. For example, when the commodity sales data resulting in the registration error is included, self-accounting is not allowed.

When the self-accounting is not allowed, the store server 10 transmits a response command of self-accounting non-permission to the information terminal 40 of the accounting command transmission source. The response command of self-accounting non-permission includes image data for guiding the customer to the face-to face register G1.

When the self-accounting is allowed, the store server 10 transmits a response command of self-accounting permission to the information terminal 40 of the accounting command transmission source. The response command of self-accounting permission includes image data for guiding the customer to the self register G2.

The processor 41 which has controlled the transmission of the accounting command in the above-described Act18 waits for a response command from the store server 10 in Act19. When the response command of the self-accounting non-permission is received from the store server 10 (NO in Act19), the processing of the processor 41 proceeds to Act20. The processor 41 displays a guide image to the face-to-face register G1 on the touch panel 45, based on the image data included in the response command, in Act20. The guide image includes a message such that "Please perform accounting at the face-to-face register.", for example.

When the response command of the self-accounting permission is received from the store server 10 (YES in Act19), the processing of the processor 41 proceeds to Act21. The processor 41 displays a guide image to the self register G2 on the touch panel 45, based on the image data included in the response command, in Act21. The guide image includes a message such that "Please perform accounting at the self register.", for example.

After having finished the processing of Act20 or Act21, the processor 41 finishes the processing in accordance with the program.

In the store introduced with the cart POS system of the present embodiment in this manner, when using the cart C, the customer M1 performs an operation for log-in to the information terminal 40 attached to the cart C. At this time, when an article other than the shopping basket BA, such as an unregistered commodity, is placed on the cart C, it is judged that the operation for log-in is ineffective. That is, when an unregistered commodity is placed on the cart C before the operation for log-in, self-registration (registration of commodity information by a customer oneself) using the cart C is inhibited, unless the commodity is removed. Accordingly, injustice such that self-registration of a purchased commodity is performed while an unregistered commodity is placed on the cart C, and the unregistered commodity is taken out from the store hidden in the purchased commodity without being subjected to accounting can be prevented from occurring.

When it is judged that the operation for log-in is ineffective, a guidance is displayed on the touch panel 45 of the information terminal 40. The guidance shall include that the operation for log-in has been judged to be an ineffective operation since an article other than the shopping basket BA is placed on the cart C, for example, and that an operation for log-in anew is suggested after having removed the article. By doing so, the customer M1 can immediately know the reason why the operation for log-in has been judged to be ineffective. For example, the customer M1 happens to perform an operation for log-in to the information terminal 40 after having placed a reusable shopping bag on the cart C. In such a case, the customer M1 may perform an operation for log-in to the information terminal 40 again, after having removed the reusable shopping bag.

It is supposed that there is the customer M1 who performs an operation for log-in again without removing an article (a commodity or the like) when the operation for log-in has been judged to be ineffective. When retry of an operation for log-in is performed, and the accumulated number of times of retry exceeds the upper limit number of times N, notification is made to the monitoring terminal 50. Accordingly, the attendant M3 can find that there is a customer who cannot perform an operation for log-in because an article other than the shopping basket is placed on the cart C, via the monitoring terminal 50. In such a case, the attendant M3 may properly deal with the case in such a manner as to go to the customer M1.

As described above, the embodiment of the log-in control apparatus which controls the operation for log-in to the information terminal in the state in which an unregistered commodity is placed on the carrier, and thereby can prevent the unjust accounting from occurring. But the embodiment is not limited to the above-described apparatus.

In the above-described embodiment, the case has been exemplified in which the information terminal 40 has the whole of the first detection means, the second detection means and the invalidation means which are necessary for functioning as the log-in control apparatus. As another embodiment, the information terminal 40 may have the first detection means and the second detection means, and the store server 10 connected to the information terminal 40 via the network or an exclusive server may have the invalidation means. By doing so, the log-in control apparatus can be configured by the information terminal 40, and the store server 10 or the exclusive server.

In the above-described embodiment, the first camera 48A and the second camera 48*b* have been used for detecting that an article is placed on the cart C. In contrast, if a cart in which an article cannot be placed on the caster portion C1 is used, it goes without saying that the embodiment may not have the second camera 48B. In addition, weight sensors in place of cameras may be provided respectively on the basket receiving portion C3 and the caster portion C1, as the first sensor 48A and the second sensor 48B. And states in which articles other than the shopping basket BA are placed on the basket receiving portion C3 and the caster portion C1 may be detected by the weight sensors, respectively.

In the above-described embodiment, the first detection means has detected the state in which an article other than the shopping basket is placed on the cart C, but may detect a state in which an article in addition to the shopping basket are placed on the cart C. By doing so, even when the vacant shopping bag BA is placed on the cart C, the operation for log-in is judged to be ineffective. But even in such a case, injustice such that an unregistered article is taken out from the store without being subjected to accounting can be prevented from occurring. Since the customer M1 has only to perform an operation for log-in before placing the shopping basket BA on the cart C, this does not become an obstacle in practical affairs.

The first detection means may detect a state in which a commodity is placed in the shopping basket BA. A commodity and another article such as a reusable shopping bag may be discriminated by analysis of the images thereof. By doing so, when a reusable shopping bag and so on other than a commodity are placed on the cart C, it is possible to judge that the operation for log-in is effective.

In the above-described embodiment, it has been exemplified that the reader 47 is made to read the data of the recording medium recorded with the member ID, and the log-in password is inputted from the touch panel 45, as the operation for log-in. However, the operation for log-in is not limited to this. For example, it is only necessary that reader 47 is made to simply read the data of the recording medium recorded with the member ID.

In the above-described embodiment, the transfer destination of the attendant notification command has been set to the monitoring terminal 50. As another embodiment, the transfer destination of the attendant notification command may be set to the POS terminal 20. In the case, since it is notified to an operator of the POS terminal 20 that there is a customer who cannot perform an operation for log-in, the operator can make a proper response.

In FIG. 5, the processings of Act1, Act6, Act7 and Act8 may be omitted. That is, when the processor 41 determines that an article is present in Act5, the processing of the processor 41 proceeds to the processing of Act9, and an attendant notification command may be outputted in Act9. Or, in FIG. 5, the processings of Act7, Act9, Act10 and Act11 may be omitted. That is, when the processor 41 determines that an article is present in Act5, the processing of the processor 41 proceeds to the processing of Act8, and the processor 41 judges that the operation for log-in is ineffective in Act8, and has only to deal with the relevant operation for log-in as if it had not been performed.

While certain embodiments have been described, these embodiments have been presented by way of example only, and are not intended to limit the scope of the inventions. Indeed, the novel embodiments described herein may be embodied in a variety of other forms; further, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information terminal which is attached to a carrier for carrying a commodity to be purchased and inputs information of the commodity for registration of the commodity to be purchased, the information terminal comprising:

- a sensor which detects whether or not a commodity is placed on the carrier, and then outputs a detection result accordingly;
- an input device which accepts an operation for log-in to the information terminal to input information for log-in;
- a memory which stores a program to control the operation for log-in; and
- a processor which executes the program to:
  - detect whether or not the operation for log-in has been received by the input device,
  - when it is detected that the operation for log-in has been received by the input device, determine, based on the detection result of the sensor, whether or not the commodity has been placed on the carrier,
  - when the operation for log-in is detected, set the operation for log-in to be in an ineffective state and notify that the commodity is on the carrier if the commodity is determined to have been placed on the carrier, and
  - after notifying that the commodity is on the carrier, detect whether or not the operation for log-in has been received by the input device again.

2. The information terminal according to claim 1, wherein, when the operation for log-in is detected, the processor determines that the operation for log-in is effective only if the commodity is not determined to have been placed on the carrier.

3. The information terminal according to claim 2, wherein

- the input device includes a touch panel, and
- the processor is configured to display a registration image for registering the commodity on the touch panel of the input device and accept an instruction for accounting for the registered commodity using the touch panel after it is determined that the operation for log-in is effective.

4. The information terminal according to claim 3, wherein the processor is configured to display, on the touch panel, a guidance message for notifying that the commodity is on the carrier.

5. The information terminal according to claim 1, wherein the sensor is attached to the carrier and detects whether or not the commodity is placed on the carrier.

6. The information terminal according to claim 5, wherein the sensor includes a radio device connected to a camera which is attached to the carrier.

7. The information terminal according to claim 1, wherein the processor is configured to:

- when the operation for log-in is detected, and if the commodity is determined to have been placed on the carrier, count a number of times for performing the operation for log-in,
- check whether or not an accumulated number of times counted for performing the operation for log-in exceeds an upper limit, and
- if the accumulated number of times counted does not exceed the upper limit, set the operation for log-in to be in the ineffective state and notify that the commodity is on the carrier.

8. The information terminal according to claim 7, wherein the processor is configured to, if the accumulated number of times counted for performing the operation for log-in exceeds the upper limit, display an attendant calling image on a touch panel of the input device and set the operation for log-in to be in an ineffective state.

9. The information terminal according to claim 8, wherein the processor is configured to change the ineffective state of the operation for log-in to the effective state when the input device receives an instruction from an attendant for releasing the ineffective state.

10. A control method for an information terminal which is attached to a carrier for carrying a commodity to be purchased and inputs information of the commodity for registration, the control method comprising:

detecting whether or not an operation for log-in has been received by an input device;

when it is detected that the operation for log-in has been received by the input device, determining whether or not a commodity has been placed on the carrier based on a detection result of a sensor which is attached to the carrier;

when the operation for log-in is detected, setting the operation for log-in to be in an ineffective state and notifying that the commodity is on the carrier if the commodity is determined to have been placed on the carrier; and after notifying that the commodity is on the carrier, detecting whether or not the operation for log-in has been received by the input device again.

11. A cart-based point-of-sale terminal, comprising:

a sensor configured to detect whether a commodity is in a cart to which the cart-based point-of-sale terminal is mounted;

an input device to accept the input of information for a log-in operation for using the cart-based point-of-sale terminal;

a processor configured by a software program to:

determine whether information for the log-in operation has been input via the input device, and when the information of log-in is input, determine based on a detection result from the sensor whether or not an item is already in the cart and deny the log-in operation if the item is already in the cart and permit the log-in operation if no item is already in the cart and the information for the log-in operation is otherwise acceptable for log-in.

12. The cart-based point-of-sale terminal according to claim 11, wherein the processor is further configured to output a notification that the item is in the cart after the log-in operation is denied because the item is already in the cart.

* * * * *